(12) United States Patent
Thompson et al.

(10) Patent No.: US 6,341,856 B1
(45) Date of Patent: Jan. 29, 2002

(54) INK JET PRINTING PROCESS USING REACTIVE INKS

(75) Inventors: Kimberlee Thompson, Mt. Pleasant; Xiaorong Cai, Charleston; Ming Xu, Mt. Pleasant, all of SC (US)

(73) Assignee: Sawgrass Systems, Inc., Mt. Pleasant, SC (US)

( * ) Notice: Subject to any disclaimer, the term of this patent is extended or adjusted under 35 U.S.C. 154(b) by 0 days.

(21) Appl. No.: 09/556,176

(22) Filed: Apr. 20, 2000

Related U.S. Application Data
(60) Provisional application No. 60/130,917, filed on Apr. 23, 1999, and provisional application No. 60/190,144, filed on Mar. 17, 2000.

(51) Int. Cl.[7] ............................................. G01D 11/00
(52) U.S. Cl. ........................ 347/100; 347/103; 347/96
(58) Field of Search ............................ 347/96, 100, 103

(56) References Cited

U.S. PATENT DOCUMENTS

| | | | | |
|---|---|---|---|---|
| 4,058,644 A | | 11/1977 | DeVries et al. | |
| 4,078,886 A | | 3/1978 | DeFago et al. | |
| 4,357,441 A | | 11/1982 | Hamamura et al. | |
| 4,589,920 A | | 5/1986 | Kanada et al. | |
| 4,605,418 A | | 8/1986 | Christie et al. | |
| 4,694,302 A | | 9/1987 | Hackleman et al. | |
| 4,725,849 A | * | 2/1988 | Koike et al. ................. | 347/103 |
| 4,730,021 A | | 3/1988 | Zom et al. | |
| 4,732,616 A | | 3/1988 | Kondo et al. | |
| 4,750,935 A | | 6/1988 | Prochaska et al. | |
| 4,847,318 A | | 7/1989 | Dennis | |
| 4,849,262 A | | 7/1989 | Uhl et al. | |
| 4,874,798 A | | 10/1989 | Koleske et al. | |
| 5,149,367 A | | 9/1992 | Reuter et al. | |
| 5,270,363 A | | 12/1993 | Kluger et al. | |
| 5,315,885 A | | 5/1994 | Szinyei | |
| 5,380,769 A | | 1/1995 | Titterington et al. | |
| 5,411,931 A | | 5/1995 | Kung | |
| 5,418,018 A | | 5/1995 | Rudder et al. | |
| 5,429,841 A | | 7/1995 | Batlaw et al. | |
| 5,431,501 A | * | 7/1995 | Hale et al. ............. | 400/120.02 |
| 5,470,818 A | | 11/1995 | Nakamura et al. | |
| 5,534,052 A | | 7/1996 | Mennicke et al. | |
| 5,556,935 A | | 9/1996 | Traubel et al. | |
| 5,563,195 A | | 10/1996 | Namba et al. | |
| 5,607,482 A | | 3/1997 | Reiff et al. | |
| 5,640,180 A | | 6/1997 | Hale et al. | |
| 5,645,888 A | * | 7/1997 | Titteringto et al. ......... | 347/103 |
| 5,646,090 A | | 7/1997 | Tamura et al. | |
| 5,665,676 A | | 9/1997 | Nakamura et al. | |
| 5,725,646 A | | 3/1998 | Krishman et al. | |
| 5,778,789 A | | 7/1998 | Krishnan et al. | |
| 5,853,861 A | | 12/1998 | Held | |
| 5,886,091 A | * | 3/1999 | Harris et al. ............... | 106/22 R |
| 6,042,641 A | * | 3/2000 | Justice ..................... | 106/31.25 |
| 6,105,502 A | * | 8/2000 | Wagner et al. ........... | 106/31.58 |

FOREIGN PATENT DOCUMENTS

JP          581520          9/1983

* cited by examiner

*Primary Examiner*—John Barlow
*Assistant Examiner*—M S Shah
(74) *Attorney, Agent, or Firm*—B. Craig Killough

(57) ABSTRACT

A method of digitally printing a liquid ink by means of a printer which uses liquid ink such as an ink jet printer. The ink contains dyes or pigments or other colorants, a liquid carrier, and compounds with functional groups capable of reacting with active hydrogen, and compounds with functional groups containing active hydrogen, or functional groups capable of conversion to active hydrogen containing groups. One or more emulsifying agents emulsify the liquid ink. An image is printed onto a substrate, at a relatively low temperature, so that the ink is not activated during the process of printing on to the medium. The image is subsequently transferred or permanently fixed on the substrate by the application of heat and pressure, which activates the ink, and bonds the colorant to the substrate. The reactive compounds may be blocked with blocking agents which are removed by the application of heat or other energy during activation of the ink.

16 Claims, No Drawings

INK JET PRINTING PROCESS USING REACTIVE INKS

This application claims priority of provisional application Serial No. 60/130,917, filed Apr. 23, 1999 and provisional application Serial No. 60/190,144, filed Mar. 17, 2000.

FIELD OF THE INVENTION

This invention relates to digital printing generally, and is more specifically directed to a method of printing an image onto a substrate by digital means using liquid reactive ink, and subsequently activating the ink to permanently fix the printed image.

BACKGROUND OF THE INVENTION

Words, images and designs are frequently printed onto clothing and other textile materials, as well as other objects. The silk screen process is a stencil process well known in the art for printing images directly onto textiles as well as indirectly via transfer paper. The two main types of screen printing inks are pigmented emulsions and plastisol inks. The emulsion inks are typically based on aqueous dispersions of a binder and cross-linking agent. The emulsion inks are used for direct printing onto all types of fabric. After printing, the prints are fixed onto the textile by heat. The plastisol inks are typically vinyl resin dispersed in plasticizer. They may be applied directly onto the fabric or used as a transfer. When used as a transfer, the ink is screen printed onto a release paper, cured to a dry film, and stored until transferred to fabric by a heat transfer process.

Traubel et al., U.S. Pat. No. 5,556,935 discloses a screen printing paste containing polyisocyanate mixtures comprising hydrophilic polyisocyanates, hydrophilic polyisocyanates containing carbidiimide groups, and/or polyepoxide compounds as cross-linking agents. However, these mixtures are insufficient under practical conditions; in particular, the finished printing pastes are not stable on storage. A continuous loss of isocyanate groups takes place through reaction of free isocyanate groups with water, which ultimately leads to products that are inactive with respect to crosslinking.

Uhl et al., U.S. Pat. No. 4,849,262 discloses a screen printing paste and aqueous dyeing liquor containing particle dispersions of polyisocyanate cross-linking agent in a deactivated (partially blocked) form. The deactivation of the particle surfaces is achieved by the dispersion of polyisocyanates in the presence of media that are reactive with isocyanate. Only the isocyanate groups present on the surface of the particles react with the deactivating agent. The rest of the polyisocyanate molecules in the interior of the particle remain unreacted. The deactivation compounds form a sort of polymer shell on the surface of the polyisocyanate particles, which is removed with heat above 60° C. Apparently this shell imparts a prolonged pot life to the printing pastes, compared to prior art.

Reiff et al., U.S. Pat. No. 5,607,482 discloses a screen printing paste containing a hydrophilic polyisocyanate prepolymer as a cross-linking agent. The isocyanate groups of the prepolymer are chemically blocked to prevent reaction. The blocking agent is removed with heat. Such print pastes show prolonged pot life due to both the complete blocking of reactive groups and the reduced number of reactive groups in the larger molecular weight prepolymer. Such a paste design is limits to silk-screen and/or offset printing only due to physical properties of the paste which include high solid percentage, high viscosity, and relatively large component particle sizes. The patent does not teach how to design an ink system which satisfies the conditions suitable for a digital printing environment. Both physical and chemical properties need to be carefully adjusted in order to meet these conditions. Furthermore, Reiff teaches only aqueous based paste system where water is an essential part of the system.

Although the silk-screen process is the predominant printing method for textiles, it does have certain disadvantages in today's digital computer age. Silk-screen is an analog printing process. As such it is not capable of matching the quality of digital graphics, especially photographic images. Nor can the process quickly or easily make changes to the print design. The use of digital computer technology allows a virtually instantaneous printing of images, each of which may be different from the other. For example, video cameras or scanning may be used to capture an image to a computer. Graphic art software allows nearly unlimited manipulation of the image. The image is typically printed by a computer driven printer that will print process color inks from multiple ink reservoirs. Printing may be done directly onto the final substrate, such as a textile fabric, or onto an intermediate substrate, such as paper, followed by a transfer process.

The digital printing field utilizes various combinations of reactive species in an effort to create an ink with increased bonding to a paper substrate. Hackleman et al., U.S. Pat. No. 4,694,302 discloses an ink jet printing system which contains a reactive species present in the ink itself (one component system) or in a separate reservoir (two component system). The reaction of the reactive species with the substrate (one component system) or with the ink (two component system) forms a polymer which binds the dye onto the surface of the substrate. Titterington et al., U.S. Pat. Nos. 5,380,769 and 5,645,888 describe ink jet ink compositions which contain at least two reactive components, a base ink which contains a crosslinkable constituent, and a curing component which is a crosslinking agent. The base ink and curing component are applied to a receiving substrate separately. The base ink is preferably applied first. Upon exposure of the base ink to the curing component, a durable, cross-linked ink is produced. Under circumstances where the crosslinkable constituent and the crosslinking agent are unreactive until a catalyst or other curing agent is introduced, both the crosslinkable constituent and a crosslinking agent may be incorporated in the ink carrier while the catalyst serves as a curing component.

Titterington et al., U.S. Pat. No. 5,645,888 applies the base ink component to an intermediate support surface to be subsequently transferred to a desired receiving surface. The curing component may be applied to the intermediate support surface directly or in combination with an ink release agent.

In Hackleman et al., U.S. Pat. No. 4,694,302, Titterington et al., U.S. Pat. No. 5,380,769 and Titterington et al., U.S. Pat. No. 5,645,888, the printing process brings into contact all reactive components, which initiates the crosslinking reaction. For images printed onto an intermediate support, transfer to the desired receiving surface must be performed while the crosslinking reaction is still occurring, to achieve the maximum adherence and durability of the ink to the surface. There is no ability for long-term storage of printed images in an unreacted form.

Held, U.S. Pat. No. 5,853,861 discloses a digital printing process, specifically ink jet printing, for direct printing onto a textile, rather than paper. The ink contains an aqueous carrier, a pigment and a polymer having acid, base, epoxy or hydroxyl functional moieties. The textile is pre-treated with a solution of either an organometallic crosslinking agent or an isocyanate crosslinking agent. Upon exposure of the printed image to an external energy source, the crosslinking agent will react with the textile and the polymer in the ink to fix the image. However, the area of the textile outside the printed image will also react with the crosslinking agent, possibly creating discoloration and a harsh hand. Also, as in Traubel et al., U.S. Pat. No. 5,556,935, the crosslinking agents are not blocked from reaction. Therefore the life of the crosslinking agent in solution and on the fabric is severely reduced. Continuous loss of reactive groups ultimately leads to a textile which is inactive with respect to crosslinking.

Various inks for use in ink jet printers are known. Solvent-based inks, including both aqueous and non-aqueous inks, are well known. Solvent-based inks can be printed using piezoelectrically actuated printheads. Images are formed by the ejection of ink droplets onto a receiving surface and subsequent removal, such as by evaporation or diffusion, of one to all of the solvents. Phase change inks are solid at ambient temperatures and liquid at the elevated operating temperatures of an ink jet printing device. Ink jet droplets in the liquid phase are ejected from the printing device at an elevated operating temperature and rapidly solidify when they contact with the surface of a substrate to form the predetermined pattern. Thermal or bubble-jet devices use heating element inside of the printing device to create instantaneous vapor bubbles and propel the ink to form small droplets from the print head and form digitally oriented image. Continuous inkjet devices use printing ink with charging characteristics and with a continuous ink droplet flow through the printing transducer. By controlling the polarity of an electrode prior to the emit nozzle it determines whether a particular ink droplet ejects or not therefore an image is formed. The present invention is suitable for one to all the above printing technologies.

Another objective of the present invention is to present a printing process which uses a reactive ink system which is a liquid at the temperature at which the printing device operates. The ink system is an emulsion or emulsion-like system, so that the ink system is stabile during storage and printing according to the processes described herein. Characteristics to be considered in preparing the ink system include, but are not limited to, particle size and particle size distribution, pH value, optical density, charge density, viscosity, and surface energy.

SUMMARY OF THE INVENTION

The present invention is a digital imaging process in which an image is printed onto a substrate, either directly or via a transfer step, and is permanently bonded to said substrate. More specifically, a method of digital printing using liquid, reactive ink and printed by an ink jet printer is presented. The reactive ink is comprised of at least one coloring agent, a binder and at least one reactive species capable of being crosslinked by a second species to bond/crosslink the coloring agent onto a final substrate, such as a textile.

The first reactive species is a nucleophilic compound capable of being crosslinked through active hydrogen containing groups, such as amine, amido, carboxylic acid, hydroxyl, thiol, urethane, or urea groups or functional groups that can be converted into active hydrogen containing functional groups, such as a carboxylic acid derivatives (ex. anhydride groups). Preferably, ink components such as colorants, vehicle and other additives also function as nucleophilic reactive compounds for fixation. In addition, a final substrate containing active hydrogen, such as hydroxyl groups (cotton), amino groups (silk), or thiol groups (wool), may contribute to this binding process and provide additional binding sites for the final image. The images so produced have excellent colorfastness to laundering and abrasion.

The second reactive species is an electrophilic crosslinking agent, which is able to crosslink the above nucleophilic compounds by abstraction of their active hydrogen. The preferred crosslinking agents are isocyanates, epoxides, and other electrophilic crosslinking agents.

The ingredients and compounds from one or both reactive chemical groups form a stable emulsion or emulsion-like system. A separate reservoir of either or both reactive components may be utilized.

To prevent premature or undesired reaction, the nucleophilic and/or electrophilic functional groups are protected either by chemical blocking with blocking agents or by physical barrier such as encapsulating agents. With such protection, the second reactive species may be present with the first in the ink itself, or it may be printed onto the same area as the first reactive species from a separate ink reservoir. The protecting agents may be removed after printing by the application of energy or heat.

The image is printed either directly onto the final substrate, or it may be printed onto an intermediate substrate, such as paper, and subsequently transferred. Fixation of the ink onto the substrate is accomplished by reacting the agents in the ink, removing blocking agent(s) by the application of energy, such as heat and/or pressure. Since fixation is independent of the printing process, images can be stored for long periods of time prior to activation. Incorporation of all necessary reactive compounds in the printed image versus applying one or both reactive species to the final substrate allows for a wide selection of preferred substrates, including but not limited to textiles. It also provides superior fixation onto the substrate surface, since the colorants are more thoroughly surrounded by the reactive compounds during the bonding/crosslinking process.

DESCRIPTION OF THE PREFERRED EMBODIMENTS

The reactive ink for ink jet printing contains one or more colorants, binders, and compounds from one or both of two reactive chemical groups: a first nucleophilic crosslinkable compound, and a second electrophilic crosslinking agent. Either or both of the reactive groups comprise a blocking agent to inhibit the reaction between the two reactive compounds until removal by the application of energy, such as heat. Humectants, additives, and co-solvents may also be included. These ingredients and the compounds from one or both reactive chemical groups may either be dissolved, dispersed, emulsified or miscible, to form a stable emulsion or emulsion-like system. A separate reservoir of either or both reactive components may be utilized as well.

Printers using various processes to print color liquid inks may be used. In a preferred embodiment of the present invention, an ink jet printer, such as a piezoelectric or phase-change ink jet printer, prints a digital image with said reactive, color inks. According to one embodiment of the invention, an ink jet printer first prints a computer-designed ink image onto a transfer medium, which may be paper.

If the image is to be transferred to a final substrate, the medium may contain an ink release coating such as silicones, fluorocarbons, etc. In a preferred embodiment, a separate reservoir of release material comprised of thermoplastic polymer, wax, plasticizer, release fluid, etc. may be applied to the medium. These release materials are not only designed to release the ink, but to increase penetration and fixation to the final substrate. Therefore, either or both reactive components may be included in the release material as well.

To improve the acceptance of ink onto the medium, especially onto hydrophobic media, the surface may contain a receiving layer with high absorptive capacity and great affinity for the ink carriers, allowing quick drying/solidification of the printed ink drops.

Printing operates at a temperature sufficient to print the ink without activating bonding and/or cross-linking of the reactive chemical groups, either within the printed material or between the print and the medium. A higher temperature is applied, preferably under pressure, to activate and permanently fix the ink onto the medium substrate, or to transfer the image from the intermediate substrate and permanently fix the image onto the final substrate. A heat press may be used to perform the transfer. Appropriate pressure is applied during the transfer process to ensure the proper surface contact of the medium and the final substrate. The ink is bonded permanently to the final substrate by means of fixation of reactive components within in the image material itself and/or between the final substrate and image material. In this manner, the image becomes permanently embedded in the substrate and excellent durability can be achieved for the final designed image.

Bonding and/or crosslinking of the color images of the present invention are provided by the reaction between compounds selected from each of two chemical groups. The first group comprises compounds with nucleophilic functional groups containing active hydrogen, such as amino, amido, carboxylic acid, hydroxyl, thiol, urethane, and urea groups. Compounds with active hydrogen functional groups after a conversion process are also suitable, such as carboxylic acid derivatives (acyl chloride, carboxylic acid anhydride, carboxylic acid ester, and carboxamide groups) which may be hydrolyzed back to a carboxylic acid via an acyl transfer reaction. A preferred set of compounds comprising hydroxyl groups is referred to herein as polyols.

The second group comprises compounds with electrophilic crosslinking groups capable of reacting with active hydrogen. Such reactive groups include isocyanate; epoxy; carboxylic acid and derivatives; organometallic crosslinking agents such as the organic chelates of titanium, aluminum, zinc, zircon or chromium; and silane coupling agents. A preferred set of compounds comprising isocyanate groups is referred to as polyisocyanates.

Preferably, the other ink components, such as colorants, binders, humactants, co-solvents, surfactants, etc. will contain chemically reactive sites, preferably active hydrogen functionality, which allows permanent bonding of every component of the image. The final substrate may contain chemically reactive sites, such as active hydrogen functionality, which allows grafting of the image with the final substrate.

Many of these reactive functional groups are very reactive at ambient temperature and will initiate curing upon contact. To prevent premature or undesired reaction, the functional groups of crosslinkable compounds and/or crosslinking agents may be protected either by chemical blocking with blocking agents or by physical barrier such as encapsulating agents. The protecting agents are preferably removed through an initiation process by the application of energy or heat. Other initiation processes may include, but are not limited to radiation, chemical reaction, pressure, and/or the combinations thereof.

Ink-jet inks are of three basic types: aqueous, non-aqueous, and hot-melt. The most common inks for drop-on-demand ink-jet printers for office quality output are aqueous-based inks whereas non-aqueous inks are prevalent for continuous ink-jet printers, especially for industrial labeling. Phase change or hot-melt inks are typically used in drop-on-demand ink-jet printers and are based on waxes/resins. The ink formulation for the present invention may be based on any of these basic types of ink-jet ink.

In a preferred embodiment, the ink contains colorants, binder, humactants, co-solvents, surfactants or emulsifiers, and both polyol and polyisocyanate reactive compounds. Additional polyol and/or polyisocyanate may be stored in another ink reservoir. In an alternate embodiment, all of the polyol is contained in the ink while all of the polyisocyanate is stored separately in another ink reservoir.

The polyisocyanate and the polyol compounds are preferred to have an average functionality between two and four. The overall ratio of the equivalents of isocyanate groups to the equivalents of active hydrogen groups may range from 1:2 to 10:1, preferably 1:1 to 2:1.

In general, these compounds may have an average molecular weight from 500 to 50,000 and preferably, an average molecular weight in the range of 1,000 to 3,000. The average molecular weight of the whole of all polyol (or isocyanate) compounds is defined as the sum of the product of the molecular weight and the mole fraction of each polyol (or isocyanate) compound in the mixture. A preferred embodiment of an ink comprises a mixture of high molecular weight compounds having molecular weights of 3,000 to 10,000, and low molecular weight compounds having molecular weights of not greater than 600.

Polyols suitable for use in the present invention may include hydroxyl functional monomeric and/or polymeric compounds. Preferred monomeric polyols include such hydroxyl functional compounds as glycerol, neopentyl glycol, trimethylol propane, ethyl butyl propanediol, trimethylol ethane, and pentaerythritol. Preferred polymeric polyols include hydroxyl functional polymers such as poly-akylene glycols; polyester polyols; acrylic polyols; and polyurethane polyols.

Polyisocyanates suitable for the present invention include aliphatic, cycloaliphatic and aromatic polyisocyanates. Particularly preferred are aliphatic polyisocyanates. Examples of such polyisocyanates include tetramethylene diisocyanate and hexamethylene diisocyanate, isophorone diisocyanate, trimethylhexamethylene diisocyanate, cyclohexane-1,4-diisocyanate, 4,4'-methylene bis(cyclohexyl isocyanate), isomeric bis(isocyanato methyl)-benzenes/toluenes, 1,4-bis (isocyanato methyl) cyclohexane, and the like. Such aliphatic polyisocyanates may be used either alone, or in a mixture with one or more of the other aliphatic polyisocyanates listed above.

Examples of aromatic isocyanates suitable for the present invention are 2,4-toluene diisocyanate, 2,6-toluene diisocyanate, commercial mixtures of 2,4- and 2,6-toluene diisocyanate, 4,4'-diphenylmethane diisocyanate, dianisidiene diisocyanate, the isomeric benzene, xylene and naphthalene diisocyanates. Such aromatic polyisocyanates may be used alone or in a mixture with other aromatic polyisocyanates, such as those listed above, or with the aliphatic polyisocyanates listed above.

In place of polyisocyanates, polyisothiocyanates, or compounds containing both isocyanate and isothiocyanate groups may be used. Specific examples include hexamethylene diisothiocyanate, tetramethylene diisothiocyanate, 2,4- and 2,6-toluene diisothiocyanate.

Chemical blocking agents may be used to prevent premature reaction of the polyisocyanates and polyols. Chemical blocking agents react reversibly with the reactive functional group. Such blocking agents may be removed by thermal, chemical, radiation, pressure, or other means, including other applications of energy Thermally labile blocking agents may be used. In a typical application, blocking agents are removed or "unblocked" in the range of 60–220° C., and the blocking agent is chosen accordingly. Unblocking temperatures lower than 60° C. typically do not provide suitable storage stability either for the ink or for the printed, non-activated image.

The temperature required to remove the protecting agents from these chemical groups typically must be greater than the temperature at which printing onto the intermediate medium occurs. Heat transfer temperatures may be in the range of 175–220° C., and therefore, the unblocking temperature must be at or below this temperature. In addition, unblocking temperatures higher than 220° C. are undesirable since temperatures elevated to, or above, this level may damage the final substrate during heat transfer. Preferably, the unblocking reaction occurs upon the application of heat between 90° C. and 200° C. For phase-change ink systems, an unblocking temperature in the range of 175–220° C. is required, due to the heat at which the ink is kept at in the ink reservoir, typically from 100° C. to 150° C.

Common thermally labile blocking agents for isocyanate reactive groups include phenols and substituted phenols, alcohols and substituted alcohols, thiols, lactams such as α-pyrrolidone, ε-caprolactam, mercaptans, primary and secondary acid amides, imides, aromatic and aliphatic amines, active methylene compounds, oximes of aldehydes and ketones and salts of sulfurous acid.

Blocking agents are frequently used in the protection of amino groups during amino acid synthesis. Such blocking agents are also useful in the protection of hydroxyl and thiol groups. Common protecting groups include the benzyloxycarbonyl group (also known as the carbobenzoxy group, Cbz), introduced by reaction with a benzyl haloformate such as benzyl chloroformate or benzyl bromoformate; the tertiary-butoxycarbonyl group (Boc), introduced by reaction with di-t-butyl dicarbonate, 2-(t-butoxycarbonyloxyimino)-2-phenylacetonitrile, 1-(t-butoxycarbonyl) imidizole, or 1-(t-butoxycarbonyl)-2-t-butyl-3-methyl-4-imidazolidinone; and the tertiary-amyloxycarbonyl group, introduced by reaction with di-t-amyl dicarbonate. Typical methods of removing these protecting groups include hydrogenation, acids, bases, etc.

A preferred blocking agent is the Boc protecting group. The Boc protecting group is stable at neutral to alkaline pH and imparts solubility in organic solvents. Further, the Boc group is shown to cleave from indoles and pyrroles cleanly and in high yield through simple thermolysis beginning at 150° C. (Rawal et al., Tetrahedron Letters, Vol. 26, No. 50, pp. 6141–6142, 1985).

The ink may include catalysts for the polyisocyanate/polyol cross-linking reaction. Examples of such catalysts include tertiary amines, such as triethylamine, triethylenediamine, hexahydro-N,N'-dimethyl aniline, tribenzylamine, N-methyl-piperidine, N,N'-dimethylpiperazine; alkali or alkaline earth metal hydroxides; heavy metal ions, such as iron(III), manganese(III), vanadium(V) or metal salts such as lead oleate, lead-2-ethylhexanoate, zinc(II)octanoate, lead and cobalt napththenate, zinc(II)-ethylhexanoate, dibutyltin dilaurate, dibutyltin diacetate, and also bismuth, antimony and arsenic compounds, for example tributyl arsenic, triethylstilbene oxide or phenyldichlorostilbene.

The ink may contain organic and/or inorganic dyes or pigments, any of which may be referred to herein as colorants. Almost any material which will lend color and which can be transported by the liquid carrier through the ink jet printer nozzles may be used. Preferred colorants are either soluble in the ink carrier or dispersed in the carrier to form a stable emulsion, or colloid with very small particle size required for transportation through the ink jet device. The average particle size of the colorant in the emulsified ink system is normally from a few nanometers to several microns and preferably from 0.005 to less than one micron in diameter. During the image fixation process, colorants may be bound by physical entrapment within the image due to bonding/cross-linking of the reactive image compounds.

In the case of water-soluble colorants, however, colorfastness is superior when the colorants are also bound by chemical bonds/cross-links either with components of the ink, or with the final substrate. Preferred are colorants that contain active hydrogen functional groups capable of participating in the chemical bonding/crosslinking process. Such colorants may be protected with blocking agents.

A novel method of preparing such active hydrogen functional colorants is presented. Reactive dyes are a class of colorants which contain fiber-reactive functional groups capable of forming covalent linkages to nucleophilic sites on textile fibers. In a preferred method of this invention, mono-, bi- and poly-functional reactive dyes may form grafts, cross-links, or copolymers with ink components with multiple nucleophilic sites. The polyhydroxyl-functional ink component, and the quantity of reactive dye fixed onto it, is such that adequate hydroxyl functionality remains for water solubility and participation in the bonding/crosslinking of the reactive ink.

The ink may also contain a binder component. Typically, the ink binder is the "glue" that holds the ink onto the substrate. Binders can be a single resin or a complex combination of resins, plasticizers, and other additives. Binders impact the viscosity of the system and promote droplet formation. The binder also serves to adhere the colorant to the surface of the substrate, control the gloss of the colorant, control the definition of the print of the colorant, and determine the alkali solubility of the ink, among other purposes. The binders are preferred to be film forming, amorphous, low odor, colorless or pale, transparent. The binders are either soluble or forming a stable emulsion or colloid in the carrier system where surfactants, emulsifiers, humactants and/or co-solvents may be used in the ink. Either structured or random polymers may be selected for use as ink binders. Structured polymers have a block, branched, or graft structure. Particularly preferred are active hydrogen functional binders that can participate in the bonding/crosslinking of the reactive ink. These reactive groups may be protected with blocking agents.

Aqueous ink formulations contain water as the majority ink carrier. Therefore, binders used in aqueous ink formulations should be water soluble, dispersible or emulsifiable polymers and copolymers. Examples of such binders include phenolics; acrylics such as poly(meth)acrylic acid and salts, polyacrylamide, polystyrene-acrylates; vinyl resins such as polyvinyl alcohol, polyvinyl acetate, and polyvinyl butyral; polyalkyleneoxides such as polyethylene oxide and polyethylene glycol; polyamides; polyamines such as polyvinylpyridine, polyvinylpyrrolidone, polyvinylamine, and polyethyleneimine; cellulose derivatives such as nitrocellulose, ethyl cellulose, ethyl hydroxyethyl cellulose, cellulose acetate butyrate, cellulose acetate propionate, and sodium carboxymethyl cellulose.

Other aqueous ink additives such as water miscible humectants, co-solvents, wetting agents, emulsifiers, solubilizers, charging agents, and dispersants may be used to assist in creating a stable emulsion or colloid of hydrophobic components in the ink suitable for either of the previous mentioned printing systems. Co-solvents may serve several functions. They act as humectants, i.e. they help minimize the evaporation of water and prevent crystallization of the dye/pigment inside the ink jet nozzle. Co-solvents also help control viscosity and the surface tension of the inks, two very important parameters. The preferred co-solvents used in this invention include but not limited to N-methyl pyrrolidone/pyrrolidinone and glycols, particularly ethylene glycol, diethylene glycol, propylene glycol, etc., as well as the ethers of such glycols, particularly mono-alkyl ethers. In general, the straight-chain ethers are more effective viscosity-reducing agents than the branched chain isomers and their efficiency increases with increasing the number of carbon atoms in the alkoxy groups.

Correctly selected co-solvents can improve the solubility of certain colorants thus producing more stable inks. Furthermore, the use of co-solvents with relatively lower boiling temperature than water may also help improve the stability of the emulsion ink system for thermal or bubble-jet inkjet system. Such co-solvents enable the quick formation of vaporized bubbles therefore preventing breakdown of emulsion particles by the heat from the heating elements, and preventing the blocked ingredients in the ink to be unblocked upon heat during printing process. Examples of such co-solvents include 1-methoxy-2-propanol, iso-propanol, and iso-butyl vinyl ether.

Wetting agents may include such compounds as fatty acid alkanolamides, oxyethylene adducts from fatty alcohols or fatty amines. Other surface tension modifiers and/or interfacial modifiers include but not limited to di-, triethanolamine, amine oxide, sulfonated alkyl/fatty ester, aromatic/alkyl phosphate ester.

Common aqueous-based dye/pigment dispersants include such compounds as lignin sulfonates, fatty alcohol polyglycol ethers, and aromatic sulfonic acids, for instance naphthalene sulfonic acids. Some dispersants are polymeric acids or bases which act as electrolytes in aqueous solution in the presence of the proper counterions. Such polyelectrolytes provide electrostatic as well as steric stabilization of dispersed particles in the emulsion. Furthermore, they supply the ink with charging characteristics in continuous inkjet ink construction. Examples of polyacids include polysaccharides such as polyalginic acid and sodium carboxymethyl cellulose; polyacrylates such as polyacrylic acid, styrene-acrylate copolymers; polysulfonates such as polyvinylsulfonic acid, styrene-sulfonate copolymers; polyphosphates such as polymetaphosphoric acid; polydibasic acids (or hydrolyzed anhydrides), such as styrene-maleic acid copolymers; polytribasic acids such as acrylic acid-maleic acid copolymers. Examples of polybases include polyamines such as polyvinylamine, polyethyleneimine, poly(4-vinylpyridine); polyquaternary ammonium salts such as poly(4-vinyl-N-dodecyl pyridinium). Amphoteric polyelectrolytes may be obtained by the copolymerization of suitable acidic and basic monomers, for instance, methacrylic acid and vinyl pyridine.

Aqueous ink also contains pH modifiers; anti-foaming chemicals such as silicone oil emulsions; fusion control agents; corrosion inhibitors; fungicides; antifreeze agents, such as ethylene glycol, propylene glycol, glycerol or sorbitol; antioxidants; and UV-light stabilizers.

The aqueous ink additives previously mentioned preferably contain reactive functional groups to improve the water resistance of the final image, since such additives are hydrophilic substances. Preferred are surfactants with active-hydrogen functional groups. Such groups may be protected with blocking agents.

For non-aqueous ink formulations, the carrier may be based on organic solvents, such as hydrocarbon, alcohol, glycol ethers, glycol esters, ketone, orester solvents. Alternately, the carrier may be based on natural or synthetic drying or nondrying oils. Preferably reactive carriers with nucleophilic functional groups containing active hydrogen are to be used in order to enhance reactivity and to reduce solid percentage. Binders used in such inks must be soluble or emulsifiable in these carriers. The ink binder may include resins, plasticizers, and waxes. Typical resins include phenolic resins, rosin modified phenolic resins, alkyd resins, hydrocarbon resins, polystyrene resins and copolymers, terpene resins, silicone resins, alkylated urea formaldehyde resins, alkylated melamine formaldehyde resins, polyamide and polyimide resins, chlorinated rubber and cyclized rubber, vinyl resins, ketone resins, acrylic resins, epoxide resins, polyurethane resins, and cellulose derivative resins. Other additives include surfactants, dispersants, antioxidants, light stabilizers, and drying oil catalysts.

For phase change, or hot melt ink formulations, hot-melt carriers are used with combinations of hot-melt resins, wax or wax-like materials, tackifying agents, and plasticizers. These materials are solid in form at room temperature but become liquid at the temperature the printer operates, generally from 50 to 150° C. Examples of phase change ink carriers include paraffins, microcrystalline waxes, polyethylene waxes, ester waxes, fatty acids, fatty alcohols, fatty amides (usually a mono-amide wax and a tetra-amide resin), sulfonamide materials, resinous materials made from different natural sources (tall oil rosins and rosin esters) and many synthetic resins, oligomers, polymers and co-polymers. A preferred tetra-amide resin is a dimer acid based tetra-amide that is the reaction product of dimer acid, ethylene diamine, and stearic acid. A preferred tackifier resin is a glycerol ester of hydrogenated abietic acid. Other additives may include binders, viscosity modifiers, light stabilizers, anti-oxidants and the like.

In the present invention, the viscosity of the ink needs to be closely controlled in order to allow the ink to print through inkjet printing device. The viscosity value of the ink should be in the range of 1–30 cps, and preferably within a range of 3–10 cps. Viscous ink outside the range may result in printing difficulties, poor droplet size/shape forming and control, and/or damaged print orifices.

Surfactants are very important in the processes of wetting, emulsification, solubilization, ink drop forming and surface energy control or modification. Surfactants used for creating oil-in-water type emulsion may include anionic, cationic, nonionic and amphoteric surfactants with various molecular weight values. Surfactants used for non-aqueous based emulsion ink system are preferably non-ionic type. Depending on the specific HLB (Hydrophillic Lipophillic Balance) values some surfactant may also be called emulsifiers or emulsifying agents. High HLB value surfactants are generally used for emulsifying oil-in-water or aqueous type of systems whereas low HLB value surfactants may generally be used to create water-in-oil or non-aqueous type of emulsion systems.

When surfactant/emulsifier concentration in a liquid carrier exceeds its critical micelle concentration (CMC), the molecules of the surfactant/emulsifier begin to aggregate. Aggregation of surfactants/emulsifier along with other ingredients forms micelles or reverse micelles, depending the main carrier phase is aqueous or non-aqueous, with a typical structure of non-soluble ingredient particles or aggregates surrounded by surfactant/emulsifier molecule layer. A homogenous, but multi-phase, system is therefore generated with small but isolated droplets of micelle carrying colorants, binders, miscible or non-miscible co-solvents and/or humectants, additives, etc. inside the micelle structure and suspending in the major carrier phase to prevent further aggregation or phase separation. These micelle particles are small enough in size to create a free flow liquid applicable in inkjet printing without clogging printing mechanism, and also protect the ingredients, especially the heat-sensitive materials inside the micelle particles having a direct contact with each other, and/or having a direct contact with printing mechanisms such as a heating element in thermal or bubble-jet inkjet printing. The non-soluble, non-miscible ingredients used in the application therefore can be stabilized with useable concentration.

In order to create a stable emulsion or colloid ink system, at least one surfactant/emulsifier should be used. Multiple surfactants/emulsifiers can also be used with combination to further enhance the protection, stability, flow characteristics, and printing performance, as long as such material does not have any negative impact on the reactive ingredients during the storage and image generating processes. Furthermore, depending on the CMC value, HLB value, and/or other characteristics of the surfactant/emulsifier, different concentration can be used in obtain best performance of the ink system corresponding to a specific printing mechanism.

Examples of surfactants and emulsifiers include alkylaryl polyether alcohol nonionic surfactants, such as Triton X series (Octylphenoxy-polyethoxyethanol); alkylamine ethoxylates nonionic surfactants such as Triton FW series, Triton CF-10, and Tergitol (Union Carbide Chemicals); polysorbate products such as Tween (ICI Chemicals and Polymers); polyalkylene and polyalkylene modified surfactants, such as Silwet surfactants (polydimethylsioxane copolymers) and CoatOSil surfactants from OSI Specialties; alcohol alkoxylates nonionic surfactants, such as Renex, BRIJ, and Ukanil; Sorbitan ester products such as Span and Arlacel; alkoxylated esters/PEG products, such as Tween, Atlas, Myrj and Cirrasol surfactants from ICI Chemicals and Polymers; unsaturated alcohol products such as surfynol series surfactants from Air Products Co., alkyl phosphoric acid ester surfactant products, such as amyl acid phosphate, Chemphos TR-421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SpA); and polyethylene glycol ether surfactants such as Newkalgen from Takemoto Oil and Fat. Co. and other commercial surfactants known to the skilled in the art.

In addition to creating a stable emulsion or colloid ink system, surfactants are also used for surface energy or surface tension control. In either aqueous or non-aqueous case, the surface tension of the final ink should range from 20 dyne/cm to 55 dyne/cm and preferably from 35 dyne/cm to 45 dyne/cm.

The final transfer substrate may include plastics, metals, wood, glass, ceramics, paper, or textile materials. Preferred are textile materials including such materials as cotton, secondary cellulose acetate, rayon, wool, silk, and polyamides such as nylon 6, nylon 66 or nylon 12. The substrates must be able to withstand the heat transfer temperature without deforming, melting or degrading. The final substrate may either contain compounds that have groups containing active hydrogen or have a surface coating containing such groups. Chemical grafting is achieved through copolymerization between the ink layer components and final substrate material, resulting in superior stability and durability.

Thermally expandable ink may be produced in which the ink and/or the medium comprises an expanding agent. Simultaneous expanding and cross-linking gives a three-dimensional image which is permanently bound to the substrate. The height of the image is dependent on the concentration of expanding agent, the temperature and the pressure applied during heat transfer printing.

Preferable expanding agents include those which decompose upon heating to release gaseous products which cause the ink to expand. Such expanding agents, known as chemical blowing agents include organic expanding agents such as azo compounds which include azobisisobutyronitrile, azodicarbonamide, and diazoaminobenzene, nitroso compounds such as N,N'-dinitrosopentamethyl-enetetramine, N,N'-dinitroso-N,N'-dimethylterephthalamide, sulfonyl hydrazides such as benzenesulfonyl hydrazide, p-toluenesulfonyl hydrazide, p-toluenesulfonyl azide, hydrazolcarbonamide, acetone-p-sulfonyl hydrazone; and inorganic expanding agents, such as sodium bicarbonate, ammonium carbonate and ammonium bicarbonate. Such expanding agents may be dissolved or dispersed in the colored ink, in a separate ink reservoir, coated on the intermediate medium, or a combination of the above.

Thermally expandable ink may alternately be produced by the use of volatile hydrocarbons encapsulated in a microsphere that ruptures upon the application of heat. The gaseous products released expand the ink. These thermally expandable microcapsules are composed of a hydrocarbon, which is volatile at low temperatures, positioned within a wall of thermoplastic resin. Examples of hydrocarbons suitable for practicing the present invention are methyl chloride, methyl bromide, trichloroethane, dichioroethane, n-butane, n-heptane, n-propane, n-hexane, n-pentane, isobutane, isophetane, neopentane, petroleum ether, and aliphatic hydrocarbon containing fluorine such as Freon, or a mixture thereof.

Materials which are suitable for forming the wall of the thermally expandable microcapsule include polymers of vinylidene chloride, acrylonitrile, styrene, polycarbonate, methyl methacrylate, ethyl acrylate and vinyl acetate, copolymers of these monomers, and mixtures of the polymers of the copolymers. A crosslinking agent may be used as appropriate.

The microcapsules may be dispersed or emulsified in a colored ink, in a separate ink reservoir, coated on the intermediate medium, or a combination of the above. The diameter of the thermally expanded microcapsule is in the range of 0.1–20 microns, and preferably within a range of 0.1–5 microns, with a greater preference of a range of 0.1–1 microns.

| Typical properties for aqueous and non-aqueous based inks: | |
| --- | --- |
| Property @ 25° C. | |
| Viscosity | 1–20 cP |
| Surface Tension | 20–50 N/m |
| Conductivity | 200 µS/cm–5 ms/cm |
| pH | 3–10 |
| Particle Size | <1 micron |
| Typical Properties of a Phase Change Ink: | |
| Tg | Below ambient |
| Melting Point | 100–130° C. |
| Viscosity | <20 cps @ 130° C. |
| Surface Tension | 40 N/m |
| Gardner number | 2+ |

| EXAMPLE 1 Component | Ink Composition (% Weight) |
| --- | --- |
| Polyisocyanate | 2–40 |
| Polyol | 5–85 |
| Catalyst | 0.1–2 |
| Colorant | 0.5–10 |
| Dispersant and/or surfactant | 0–30 |
| Binder | 0–20 |
| Solvent or co-solvent | 0–30 |
| Carrier | 0–90 |

What is claimed is:

1. A method of digital printing, comprising the steps of:
   a. preparing a liquid ink which is liquid at ambient temperature, said liquid ink comprising a colorant, at least one compound having at least one functional group which reacts with active hydrogen, at least one compound having at least one functional group containing active hydrogen and at least one blocking agent which, during storage and printing of said liquid ink, prevents a reaction between said at least one compound having at least one functional group which reacts with active hydrogen, and said at least one compound having at least one functional group containing active hydrogen;
   b. supplying a digital printer which uses liquid ink with said liquid ink;
   c. digitally printing said liquid ink onto a substrate to form an image on said substrate; and
   d. subsequently removing said blocking agent and reacting said at least one compound having at least one functional group which reacts with active hydrogen with said at least one compound having at least one functional group containing active hydrogen to bond said image to said substrate.

2. A method of digital printing as described in claim 1, wherein, after said liquid ink is printed, said blocking agent is removed by the application of heat to said image.

3. A method of digital printing as described in claim 1, wherein said at least one compound having at least one functional group which reacts with active hydrogen is an isocyanate.

4. A method of digital printing as described in claim 1, wherein said at least one compound having at least one functional group containing active hydrogen is a polyol.

5. A method of digital printing as described in claim 3, wherein said at least one compound having at least one functional group containing active hydrogen is a polyol.

6. A method of digital printing, comprising the steps of:
   a. preparing a liquid ink which is liquid at ambient temperature, said liquid ink comprising a colorant, at least one compound having at least one functional group which reacts with active hydrogen, at least one compound having at least one functional group containing active hydrogen, and at least one blocking agent which, during storage and printing of said liquid ink, prevents a reaction between said at least one compound having at least one functional group which reacts with active hydrogen, and said at least one compound having at least one functional group containing active hydrogen;
   b. supplying a printer which uses liquid ink with said liquid ink;
   c. digitally printing said liquid ink on a first substrate to form an image on said first substrate; and
   d. subsequently transferring said image from said first substrate to a second substrate, and removing said blocking agent and reacting said at least one compound having at least one functional group which reacts with active hydrogen with said at least one compound having at least one functional group containing active hydrogen, to bond said image to said second substrate.

7. A method of digital printing as described in claim 6, wherein, after said liquid ink is printed, said blocking agent is removed by the application of heat to said image.

8. A method of digital printing as described in claim 6, wherein said at least one compound having at least one functional group which reacts with active hydrogen is an isocyanate.

9. A method of digital printing as described in claim 6, wherein said at least one compound having at least one functional group containing active hydrogen is a polyol.

10. A method of digital printing as described in claim 6, wherein said at least one compound having at least one functional group containing active hydrogen is a polyol.

11. A method of digital printing by means as described in claim 1, wherein said liquid ink further comprises an aqueous carrier.

12. A method of digital printing by means as described in claim 6, wherein said liquid ink further comprises an aqueous carrier.

13. A method of digital printing by means as described in claim 11, wherein said liquid ink is an emulsion.

14. A method of digital printing by means as described in claim 12, wherein said liquid ink is an emulsion.

15. A method of digital printing by means as described in claim 1, wherein said liquid ink has a viscosity of 1 to 30 centipoise at ambient temperature.

16. A method of digital printing by means as described in claim 6, wherein said liquid ink has a viscosity of 1 to 30 centipoise at ambient temperature.

* * * * *